United States Patent
Cohen et al.

(10) Patent No.: US 8,699,493 B2
(45) Date of Patent: Apr. 15, 2014

(54) ROUTING VALIDATION

(75) Inventors: Alain J. Cohen, Washington, DC (US); Pradeep K. Singh, Arlington, VA (US); Vinod Jeyachandran, Rockville, MD (US); Nitin Gupta, Chevy Chase, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 99 days.

(21) Appl. No.: 13/412,604

(22) Filed: Mar. 5, 2012

(65) Prior Publication Data

US 2012/0163197 A1    Jun. 28, 2012

Related U.S. Application Data

(63) Continuation of application No. 11/494,441, filed on Jul. 27, 2006, now Pat. No. 8,130,759.

(60) Provisional application No. 60/703,583, filed on Jul. 29, 2005.

(51) Int. Cl.
*H04L 12/28* (2006.01)

(52) U.S. Cl.
USPC .......................................... 370/392; 709/238

(58) Field of Classification Search
CPC ..................................................... H04L 12/26
USPC .................................... 370/392, 250; 709/238
See application file for complete search history.

(56) References Cited

U.S. PATENT DOCUMENTS

| | | |
|---|---|---|
| 5,375,199 A | 12/1994 | Harrow et al. |
| 6,061,724 A | 5/2000 | Ries et al. |
| 6,313,768 B1 | 11/2001 | Dowell |
| 6,449,739 B1 | 9/2002 | Landan |
| 6,529,954 B1 | 3/2003 | Cookmeyer et al. |
| 6,781,959 B1 | 8/2004 | Garakani et al. |
| 6,801,940 B1 | 10/2004 | Moran et al. |
| 6,871,227 B2 | 3/2005 | Allen |
| 6,975,330 B1 | 12/2005 | Charlton et al. |
| 7,010,593 B2 | 3/2006 | Raymond |
| 7,197,559 B2 | 3/2007 | Goldstein et al. |
| 7,218,928 B2 | 5/2007 | Park et al. |
| 7,290,048 B1 | 10/2007 | Barnett et al. |
| 7,293,287 B2 | 11/2007 | Fischman et al. |
| 7,392,234 B2 | 6/2008 | Shaath et al. |
| 7,467,202 B2 | 12/2008 | Savchuk |
| 7,509,229 B1 | 3/2009 | Wen |
| 7,546,368 B2 | 6/2009 | Drees et al. |
| 7,577,689 B1 | 8/2009 | Masinter et al. |
| 7,593,351 B1 | 9/2009 | Zioulas et al. |
| 7,606,165 B2 | 10/2009 | Qiu et al. |
| 7,730,172 B1 | 6/2010 | Lewis |

(Continued)

*Primary Examiner* — Wei Zhao
(74) *Attorney, Agent, or Firm* — Robert M. McDermott

(57) ABSTRACT

A simulator simulates routing system protocols to build routing tables corresponding to a modeled network, and a comparator compares the routing tables in the actual network to these simulator-created routing tables. Because the modeled system represents a fault-free version of the actual system, and assuming that the modeled routing system protocols are representative of the algorithms used in the actual routers, these simulator-produced routing tables can represent steady-state routing tables that should be present in the routers of the actual network at steady state. By querying each router in the actual network for its routing table and comparing each routing table to the corresponding simulator-produced routing table, any differences from the steady state can be identified.

12 Claims, 2 Drawing Sheets

(56) References Cited

U.S. PATENT DOCUMENTS

| | | |
|---|---|---|
| 7,891,000 B1 | 2/2011 | Rangamani et al. |
| 7,925,729 B2 | 4/2011 | Bush et al. |
| 7,954,144 B1 | 5/2011 | Ebrahimi et al. |
| 7,979,522 B2 | 7/2011 | Lunsford |
| 7,984,126 B2 | 7/2011 | McBride |
| 2002/0078195 A1 | 6/2002 | Allen |
| 2002/0124070 A1 | 9/2002 | Pulsipher |
| 2002/0198985 A1 | 12/2002 | Fraenkel et al. |
| 2003/0065986 A1 | 4/2003 | Fraenkel et al. |
| 2003/0131098 A1 | 7/2003 | Huntington et al. |
| 2003/0135612 A1 | 7/2003 | Huntington et al. |
| 2003/0142679 A1* | 7/2003 | Okagawa et al. ............ 370/397 |
| 2003/0231587 A1* | 12/2003 | Sankaran et al. ............ 370/230 |
| 2004/0049693 A1 | 3/2004 | Douglas |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2005/0064820 A1 | 3/2005 | Park et al. |
| 2005/0102402 A1 | 5/2005 | Whitehead |
| 2005/0102423 A1* | 5/2005 | Pelavin et al. ................ 709/238 |
| 2005/0108379 A1 | 5/2005 | Gray et al. |
| 2005/0195797 A1 | 9/2005 | Kryuchkov et al. |
| 2006/0190480 A1 | 8/2006 | Ori et al. |
| 2006/0190488 A1 | 8/2006 | Cohen et al. |
| 2006/0274684 A1 | 12/2006 | Diener |
| 2008/0263112 A1 | 10/2008 | Shaath et al. |
| 2009/0204704 A1 | 8/2009 | Muret et al. |
| 2011/0167145 A1 | 7/2011 | Bush et al. |
| 2011/0213869 A1 | 9/2011 | Korsunsky et al. |

* cited by examiner

ROUTING VALIDATION

CROSS REFERENCE TO RELATED APPLICATIONS

This application is a continuation of U.S. patent application Ser. No. 11/494,441, filed Jul. 27, 2006, now U.S. Pat. No. 8,130,759, which claims the benefit of U.S. Provisional Patent Application 60/703,583, filed 29 Jul. 2005, and U.S. Non-Provisional application Ser. No. 11/494,441, filed Jul. 27, 2006, both of which are expressly incorporated by reference herein in their entirety.

BACKGROUND AND SUMMARY OF THE INVENTION

This invention relates to the field of communication systems, and in particular to network management and network simulation.

Routers are used in networks to forward messages from one node to another in the network until the message reaches its intended destination. Routers use "forwarding tables", or "routing tables" to facilitate the determination of the appropriate node to forward each message. For ease of reference, the term 'router' is used herein to refer to any device or system that is used to forward messages based on an address associated with the communication, including communication switches and the like. In like manner, the terms 'forwarding table' or 'routing table' are used herein to refer to any directives or indices that the router uses to select a communication path for each message or group of messages, regardless of whether these directives or indices are in the form of a table, and include, for example, virtual routing tables, forwarding information bases (FIBs), and so on.

FIG. 1 illustrates an example network, and an example set of forwarding tables 101A-101E corresponding to the routers A-E of this network. In this example, circles are used to indicate routers, and squares are used to indicate destination sub-networks. As illustrated in FIG. 1, each entry in each router's forwarding table includes a prefix 110, a source protocol 120, a next hop 130, and a metric 140. The prefix 110 is the network address corresponding to a range of destination addresses. The source protocol 120 is the communication protocol for use of this entry in the forwarding table. The next hop 130 identifies the router to which the message will be transmitted if this entry is used. The metric 140 identifies the "cost" associated with transmitting the message to the destination if this entry is used.

In the example forwarding table, symbols A-H are used to indicate the addresses of the routers, and W-Z are used to indicate the sub-network prefix addresses. In an actual forwarding table, actual addresses, such as an IP address, would appear. Also in actual tables, ranges of addresses are used in lieu of individual prefixes 110, and, optionally, a default ("def") or "last resort" entry 111 may be used to identify a next-hop for prefixes that are not explicitly included in the forwarding table. In like manner, the symbol P is used in the example forwarding tables to indicate a protocol, although the actual protocol, such as "OSPF" or "BGP" would appear in an actual forwarding table. Other information may also appear in a forwarding table.

In the example of FIG. 1, the links between routers include a figure/metric that represents the example cost of communicating a message unit between the routers. For example, to send a message unit between routers A and B, the cost is "1", whereas to send a message between routers A and F, the cost is "2". Also in this example, the cost of communications between a sub-network and its supporting router is assumed to be zero.

Typically, each router broadcasts its forwarding table to each other router in the network. If the network is large, network 'areas' may be defined to limit the 'flooding' of this information throughout the network, and/or other hierarchical structures may be used. The receiving router selectively updates its forwarding table based on the entries of each of the received other forwarding tables. The cost of using each route in a neighbor's forwarding table is determined from the neighbor's metric entry 140, plus the cost of reaching that neighbor. Based on these metrics, and perhaps other criteria, depending upon the particular protocol, each router determines a preferred next-hop for each address and/or each range of addresses, including the 'last resort' next-hop.

Once a network is established, all of the forwarding tables achieve a 'steady state', or 'converged' condition, wherein each router includes a preferred next-hop entry for each destination address. For example, based on the link cost/metrics illustrated in FIG. 1, a message at router F with a destination address having a prefix W has a total cost/metric of "3" 141, based on an F-A link cost of "2" plus an A-C link cost of 1. To achieve this cost/metric of "3", the message should be routed from node F to preferred next-hop "A" 131. This steady state does not change unless and until a change occurs in the network. Such changes may be intentional or unintentional, where unintentional changes include mistaken or unintentional reconfigurations of routing parameters, undetected component or link failures, and so on.

Conventional routing protocols are purposely designed to be robust, and provide for dynamic updating of the routing tables when faults occur. Often, a network's performance degrades gradually over time, to the point that the performance becomes unacceptable; but, because of the fault-masking provided by dynamic routing protocols, the cause(s) of the problem may not be readily apparent.

It is an objective of this invention to provide a method and system for identifying potential causes of degradations in network system performance. It is a further objective of this invention to provide a method and system for identifying intentional and unintentional changes to routing table entries.

These objectives and others are achieved by providing a simulator that simulates routing system protocols to build routing tables corresponding to a modeled network, and comparing the routing tables in the actual network to these simulator-created routing tables. Because the modeled system represents a fault-free version of the actual system, and assuming that the modeled routing system protocols are representative of the algorithms used in the actual routers, these simulator-produced routing tables will represent the 'ideal' routing tables that should be present in the routers of the actual network. By querying each router in the actual network for its routing table and comparing each routing table to the corresponding simulator-produced routing table, any differences from the 'ideal' can be identified.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
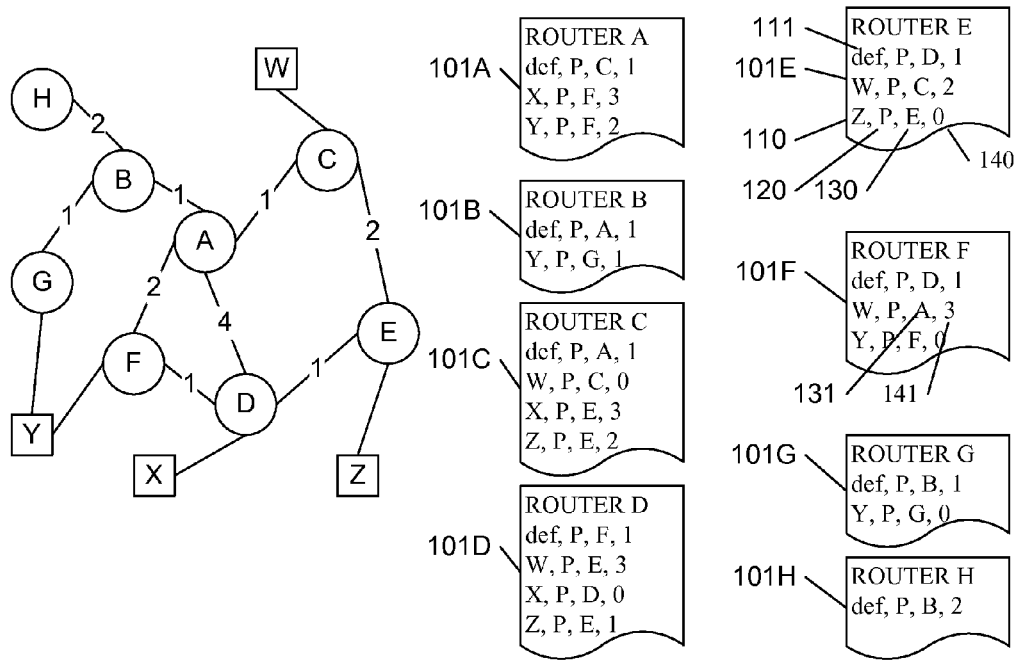
FIG. 1 illustrates an example network and associated routing tables.
Figure 2:
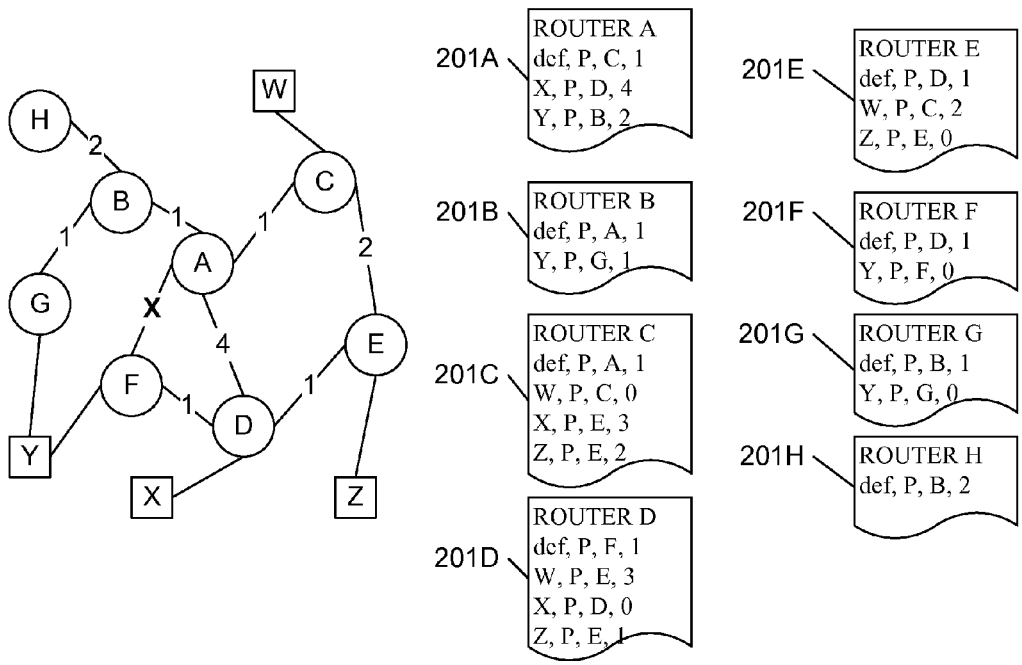
FIG. 2 illustrates the example network of FIG. 1 and associated routing tables after a change to the network.

FIG. 2 illustrates a change to the example network diagram of FIG. 1, wherein the link between nodes A and F is severed. Such a failure may be caused by a hardware failure, a media failure, a mis-configuration of equipment, and so on, at one or both of the nodes A, F. In a conventional network with dynamic routing protocols, the routers A-H will automatically reroute messages around the problem. Although this automatic rerouting is desirable from a network performance viewpoint, the fact that the link between A and F is not performing as intended is not immediately apparent. Although the network may include special-purpose network monitoring equipment to independently test each link, such equipment can add substantial costs and overhead complexities to the operation of the network.

This invention is premised on the observation that failures that occur within networks often result in the automatic rerouting of messages around such failures, and that such rerouting is often reflected in the routing tables of the routers affected by these failures.

A comparison of the routing tables 201A-H corresponding to the network of FIG. 2 with the routing tables 101A-H corresponding to the network of FIG. 1 reveals differences at routers A and F. In table 101A, messages with destination addresses of Y are routed from node A to node F; in table 201A, because the link A-F is severed, messages with destination addresses of Y are routed from node A to node B. Similarly, in table 101F, messages with destination addresses of W are routed from node F to node A, while in table 201F, messages with destination addresses of W are routed from node F to node F's default node D.

Thus, in the example of FIGS. 1 and 2, by comparing "before" and "after" sets of routing tables, differences in the routing tables of nodes A and F are identified, which would lead a network manager to suspect that a problem may have developed in the link between nodes A and F. Often, however, a "before" set of routing tables is not available; or, if a "before" set is available, there is no assurance that the "before" set is representative of a fault-free configuration of the network.

Simulation is a tool that is commonly used to assess the expected performance of a network, typically before the network is implemented, or to assess the expected performance of a change to an existing network, also typically before the change is implemented. Generally, the performance of the network is evaluated by simulating the generation of traffic and determining timing parameters related to the processing and propagation of the traffic through the network, based on models of the components of the network and their interconnection.

The models of routers used within the simulation of a network preferably include the ability to emulate the algorithms used within actual routers to implement one or more routing protocols to achieve convergence to a state corresponding to the steady state condition of the modeled network. This state is generally considered an 'internal state' which is required to effectively model the network, but rarely reported to a user of the simulator.

In accordance with this invention, recognizing that a simulated model of a network generally represents a fault-free, or 'ideal', configuration of the network, the state of the routing tables within the simulation of the network is provided for comparison with a given steady state condition of the routers in the actual network being modeled.

Figure 3:
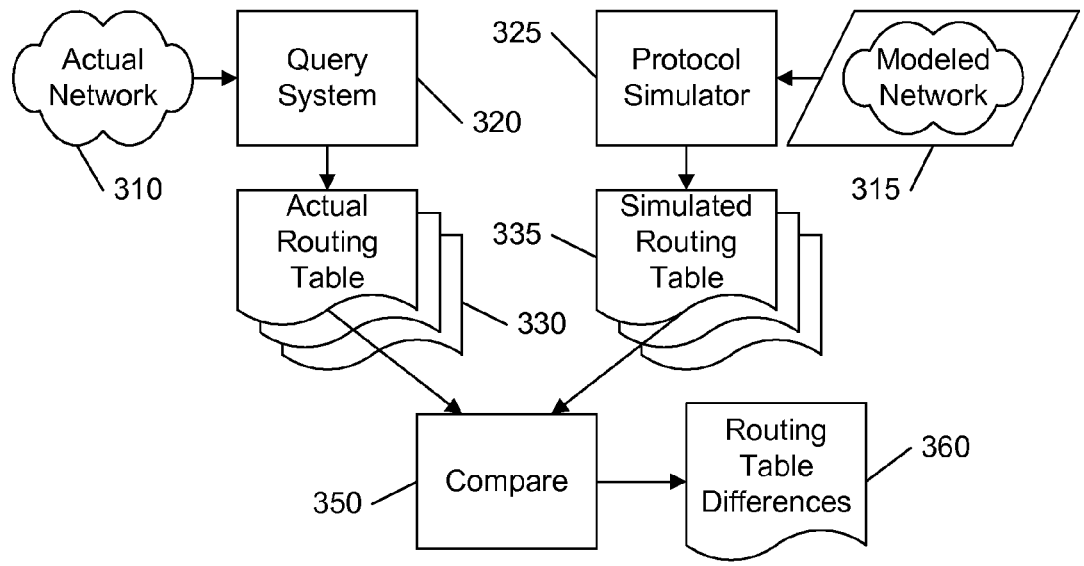
FIG. 3 illustrates an example block diagram of a routing table validation system.

FIG. 3 illustrates an example block diagram of a system that facilitates the comparison of routing tables 330 of an actual network 310 to routing tables 335 of a modeled 'ideal' network 315. Other techniques may be used to identify changes, including automated processes that periodically updates the modeled network.

A query system 320 is configured to interrogate routers within the network 310 to determine the entries in their routing tables. Any of a variety of techniques may be used to perform this query. All or some of the routers may be interrogated, depending upon the purpose of the comparison. For example, if a suspected problem is determined to be isolated to a given region of the network, only routers in that area need be queried. Finding the routers in a network can be accomplished by tracing through all identified 'next-hops' routers until each next-hop router has been visited/queried at least once. Depending upon the particular router manufacturer, and/or the particular routing protocol, different routers may respond differently to a routing table query; in a preferred embodiment, the query system 320 is configured to convert the information received from each router into a standardized routing table 330 that facilitates comparisons.

A protocol simulator 325 is configured to simulate a model 315 of the actual network 310 to determine a set of steady state routing tables corresponding to the modeled network 315. The protocol simulator 325 may be a component of a larger network simulation system, or it may be a custom designed simulator that is configured to model a network of routers. In either embodiment, the simulator 325 includes models of routers that execute the same algorithms as used in the actual routers running each type of routing protocol.

Figure 4:
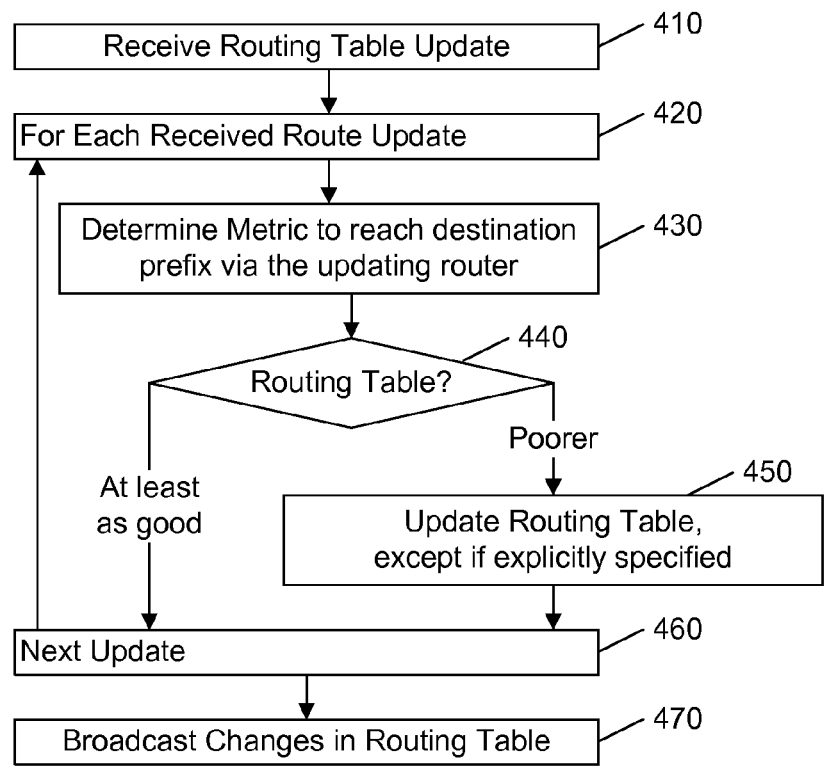
FIG. 4 illustrates an example flow diagram of a protocol simulation system.

FIG. 4 illustrates an example flow diagram of a model of an example routing protocol, corresponding to a simplified OSPF (Open Shortest Path First) routing protocol. One of ordinary skill in the art will recognize that this model is presented for descriptive purposes only, the actual routing protocol algorithms being somewhat more complex. The Internet Society maintains a collection of standards that provide the details for each of the protocols commonly used in most networks.

At 410, the router receives a routing table update from another router, which may contain one or more route/link-state updates. Initially, each simulated router includes either a default routing table as provided by the manufacturer, or a routing table corresponding to a defined explicit routing table, and this initial table is broadcast from each router to each other router, or to a subset of other routers, depending upon the particular routing protocol. For example, in the OSPF protocol, each router initially 'floods' the network, or a select network area, with its routing table, and any subsequent changes to its routing table; in the RIP protocol, each router communicates its routing table only to its immediate neighbor, and does so periodically.

The loop 420-460 processes each route update. The update will identify the destination-address prefix and the metric associated with communicating a packet to this prefix via the router that communicated the update. At 430, the metric for reaching this prefix is updated to include the metric associated with reaching the router that sent the update, and, at 440, this metric is compared to the metric associated with reaching this prefix that is stored in the router's current routing table. If, at 440, the routing table's current entry includes a metric that is at least as good as that provided by communicating via the router sending the update, no changes are made, and the next routing update is processed, via the loop 430-460. If, at 440, the routing table entry is poorer than the determined metric, the prior entry at the routing table is deleted, and a new entry is created to identify the destination prefix, the protocol, the router sending the update as the 'next-hop', and the determined metric associated with using this next-hop to arrive at the destination prefix. The routing table entry is not replaced, however, if the user has explicitly specified a route for the given destination prefix, corresponding, for example, to an intended configuration or reconfiguration of a router in the actual network.

After all of the routing table updates have been processed, the resultant routing table changes are transmitted from this router to each of the other routers in the network or network area, at 470. As these changes are received at other routers, those routers execute the updating process of FIG. 4 for these received routing table updates. As the network routers achieve a steady-state condition, the number of times the process of FIG. 4 results in changes to a router's routing table decreases. Eventually, the network converges to a steady-state condition, wherein each router's routing table includes the best next hop for each destination prefix, and no changes are broadcast at 470.

Returning to the flow of FIG. 3, after the routers in the modeled network converge to a steady state condition, the protocol simulator 325 outputs the resultant routing tables 335, preferably in the same format as the routing tables 330, to facilitate a comparison of these tables 330, 335. As noted above, assuming that the protocol simulator 325 accurately models the algorithms used in the actual routers, these simulated routing tables 335 correspond to the routing tables that would be produced in an ideal, fault-free network.

A comparison module 350 compares the actual routing tables 330 to the simulated routing tables 335, and identifies the differences 360 between these tables 330, 335. As applied, for example, to the networks of FIGS. 1 and 2, the simulation of the fault-free network of FIG. 1 would produce the routing tables 101A-H of FIG. 1, whereas the actual network would produce the routing tables 201A-H of FIG. 2 if the fault on the link A-F were present. The comparison 350 would result in an identification of differences in routing tables (101A, 201A) and (101F, 201F), thereby alerting a network manager of a problem that is affecting nodes A and F.

The comparison module 350 may be configured to selectively determine logical equivalences among routing tables, as well as literal equivalences. For example, depending upon the particular sequence of updating each routing table, particularly in the presence of equal-cost alternative routes, the organization of each routing table with regard to destination prefixes may vary. In a preferred embodiment, a user is provided the option of configuring the comparison module 350 to ignore metric differences and only report differences in the routing tables that result in a different next-hop for the same destination prefix, or configuring the comparison module 350 to ignore next-hop differences and only report differences in the routing tables that result in a different metric for the same destination prefix, or configuring the comparison module 350 to only report differences in the routing tables that result in both a different metric and a different next-hop, and so on.

Note that although the invention is particularly well suited for detecting routing table differences between the actual network and an "ideal" network, such as a simulated network, one of ordinary skill in the art will recognize that the techniques disclosed herein are not limited to such a comparison. The comparison may, for example, be performed between copies of the routing tables obtained from the actual network at different times, or two copies of the routing tables obtained from two different simulations of the network. In like manner, the techniques disclosed herein can be used to facilitate the development and de-bug of newly developed models of routers or routing protocols. That is, if a new routing protocol is being modeled for use in a simulator or other automation tool, the operation of the model may be compared to the actual operation of a known-good router, or network of known-good routers, to verify that the model accurately reflects the algorithms used in the actual devices.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

What is claimed is:
1. A method of identifying a cause of performance degradation in a network, said method comprising:
receiving, from the network, a first set of routing tables, wherein the first set of routing tables represent a current state of the network based on entries that indicate a next hop and a metric for a destination;
determining a second set of routing tables based on simulating changes to the first set of routing tables to a steady-state condition;

identifying a cause of performance degradation in the network based on differences between the entries in the first and second set of routing tables; and
outputting information indicating the cause of performance degradation;
wherein identifying the cause of performance degradation in the network comprises identifying at least one of:
at least one difference between at least one next hop in the first set of routing tables and a corresponding next hop in the second set of routing tables; and
at least one difference between the metric for a destination in the first set of routing tables and a corresponding metric in the second set of routing tables.

2. The method of claim 1, wherein receiving the first set of routing tables comprises querying a plurality of routers in the network.

3. The method of claim 1, wherein determining the second set of routing tables comprises generating a simulated model of the network by a computer processor and simulating a plurality of routers in the network.

4. The method of claim 3, wherein the simulated model of the network comprises parameters indicating one or more routing protocols employed in the network.

5. The method of claim 4, wherein the simulated model of the network comprises parameters indicating at least one routing table update algorithm corresponding to each of the one or more routing protocols.

6. A network monitoring system coupled to a network and configured to provide information indicating a suspected cause of degradation in performance of the network, said system comprising:
at least one interface, coupled to the network, configured to receive a plurality of routing tables from routers in the network, wherein the routing tables indicate a current state of the network and comprise entries for a next hop and a metric to a destination; and
a processor configured to model the network based on the received plurality of routing tables, simulate convergence of the network to a steady-state condition, determine a simulated set of routing tables based on the simulated steady-state condition, identify a suspected cause of degradation based on differences between entries in a set of routing tables received from the network and the simulated set of routing tables, and providing information indicating the suspected cause of degradation;
wherein the processor is configured to identify the suspected cause of the degradation by at least one of:
identifying at least one difference between at least one next hop in the received set of routing tables and a corresponding next hop in the simulated set of routing tables; and
identifying at least one difference between the metric for a destination in the received set of routing tables and a corresponding metric in the simulated set of routing tables.

7. The system of claim 6, wherein the processor is configured to query, via the at least one interface, a plurality of routers in the network for their respective routing tables.

8. The system of claim 6, wherein the processor is configured to simulate convergence of the network to a steady-state condition based on one or more routing protocols employed in the network.

9. The system of claim 8, wherein the processor is configured to simulate convergence of the network to a steady-state condition based on at least one routing table update algorithm corresponding to each of the one or more routing protocols.

10. A network monitoring system for monitoring performance of a network, said system comprising:
a query system configured to query routers in the network and receive routing tables from the routers having entries indicating next hops and metrics to destinations;
a simulator configured to model the network based on the received routing tables and determine a simulated set of routing tables representative for the simulated network at a steady-state condition; and
a comparator configured to compare the simulated set of routing tables representative of a steady-state condition of the simulated network with a set of routing tables from the network representative of a current state of the network and provide an output indicating differences between the simulated set of routing tables and the received set of routing tables;
wherein the comparator the determines the differences between the simulated set of routing tables and the received set of routing tables by at least one of:
identifying at least one difference between at least one next hop in the simulated set of routing tables and a corresponding next hop in the received set of routing tables; and
identifying at least one difference between the metric for a destination in the simulated set of routing tables and a corresponding metric in the received set of routing tables.

11. The system of claim 10, wherein the simulator is configured to determine the simulated set of routing tables at the steady-state condition based on one or more associated routing protocols.

12. The system of claim 10, wherein the simulator is configured to determine the simulated set of routing tables at the steady-state condition based on at least one routing table update algorithm corresponding to each of the one or more associated routing protocols.

* * * * *